350-6.5 SR
XR 3,548,096
SEARCH ROOM

United St...

[11] 3,548,096

SUBSTITUTE FOR MISSING XR

[72] Inventors Glenn A. Reese
... Calif.;
Robert R. Goodrich; Ben W. Krone,
Champaign, Ill.

[21] Appl. No. 803,163
[22] Filed Feb. 28, 1969
[45] Patented Dec. 15, 1970
[73] Assignee The Magnavox Company
Fort Wayne, Ind.
a corporation of Delaware

[54] LIGHT BALANCING SHADE FOR FACSIMILE SCANNER
2 Claims, 6 Drawing Figs.

[52] U.S. Cl. 178/7.1, 178/7.6; 350/285
[51] Int. Cl. H04n 3/06
[50] Field of Search 350/271, 266; 178/7.1, 7.1E, 7.6

[56] References Cited
UNITED STATES PATENTS

| | | | |
|---|---|---|---|
| 3,397,025 | 8/1968 | Alm | 350/271 |
| 3,475,553 | 10/1969 | Reese et al. | 178/7.1 |
| 3,453,040 | 7/1969 | Sparling | 350/275 |
| 3,502,803 | 3/1970 | Bigenwald | 178/7.1 |

*Primary Examiner*—Robert L. Griffin
*Assistant Examiner*—Donald E. Stout
*Attorney*—Richard L. Seeger

ABSTRACT: A facsimile scanner utilizes a single light source that is reflected by two concave mirrors to respective focal points positioned on a common diameter at equal distances from a longitudinal axis of rotation. The light and mirrors rotate so as to provide two alternating scanning spots of light on a document. In order that the two spots of light have equal intensity, with the accompanying stable operation, a balancing light shade is provided in the path of light having the higher intensity.

INVENTORS
ROBERT R. GOODRICH
BEN W. KRONE
GLENN A. REESE
BY Jeffers and Young
ATTORNEYS

INVENTORS
ROBERT R. GOODRICH
BEN W. KRONE
GLENN A. REESE

BY Jeffers and Young
ATTORNEYS

INVENTORS

ROBERT R. GOODRICH
BEN W. KRONE
GLENN A. REESE

BY Jeffers and Young
ATTORNEYS

LIGHT BALANCING SHADE FOR FACSIMILE SCANNER

BACKGROUND OF THE INVENTION

Our invention relates to a light balancing shade for facsimile scanners which utilize two spots of light for scanning, and particularly to such a light balancing shade for equalizing the intensity of the two spots of light.

In one type of facsimile scanner, the document to be scanned is positioned on a concave surface extending parallel to a longitudinal axis of the scanner. A light source and two concave mirrors are rotated about this longitudinal axis to provide two rotating spots of light which are focused on a common diameter at equal distances from the longitudinal axis of rotation. As the two spots of light are rotated, they alternately illuminate the document over a small area. Light reflected from the illuminated document is directed to a light sensitive device that converts the light energy into electrical signals that indicate the nature or characteristic of the document. These electrical signals can be utilized at a remote location to reproduce the document. Where a facsimile scanner uses two rotating spots of light as described, it is desirable that the two spots of light be focused as precisely as possible at the same locations with respect to the longitudinal axis of rotation, and that the two spots of light have equal intensities at the surface of the document being scanned. The equal intensities are particularly desirable and important, since a change in light intensity normally indicates a change in the amount of reflected light. And a change in the amount of reflected light normally indicates a transition between dark and light color in the scanned area. If one light spot has a higher light intensity, it would produce a greater amount of reflected light. This greater reflected light would cause the document being reproduced to appear lighter in color over the area covered by the higher intensity spot. Such a lighter color would result in a document having light streaks which render the document useless, or of poor quality.

Accordingly, an object of our invention is to provide an improved facsimile scanner having two rotating spots of light whose intensities can be made substantially equal.

Another object of our invention is to provide an improved facsimile scanner having a light balancing shade for shading the path of light which provides the higher intensity spot on the document being scanned.

The problem of providing two rotating spots of light having equal intensities has been present for some time. The mirrors providing the two spots of light have been made as sturdy and stable as possible, but it is still very difficult to provide a large number of concave mirrors all having the same optical or light reflecting characteristics. These different characteristics have been compensated to some extent by adjusting the mirrors on a scanner until their light intensities at the selected area are equal. However, we have found that this is a difficult and time consuming adjustment. Further, we have found that this is a critical adjustment which can be easily upset or ruined.

Accordingly, another object of our invention is to provide an improved light balancing shade for a facsimile scanner which permits some discrepancy between the scanner reflecting mirrors, but which permits equal light intensities to be provided by the mirrors.

Another object of our invention is to provide an improved light balancing shade which permits the reflecting mirrors of a facsimile scanner to be independently adjusted to provide the desired focal point positions, after which the light intensities provided by the mirrors can be easily and precisely equalized without changing the focal point positions.

SUMMARY OF THE INVENTION

Briefly, these and other objects are achieved in accordance with our invention by providing a light shade in the higher intensity path of light provided by one of the two concave mirrors. The light balancing shade is arranged so that it can be adjusted into or out of the path of light with relative ease, and so that once the adjustment is made, can be securely held. In a facsimile scanner, the mirrors are first adjusted so that they focus the light at spots having the desired locations. Then, the higher intensity path of light is shaded by our light balancing shade until the light intensities of the two spots are equal. Once the balancing point for the shade is found, the shade may be locked in position with the assurance that the light intensities of the two spots are equal, and that a balanced operation will be provided by the facsimile scanner.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF THE PREFERRED EMBODIMENT

Figures 1, 2:
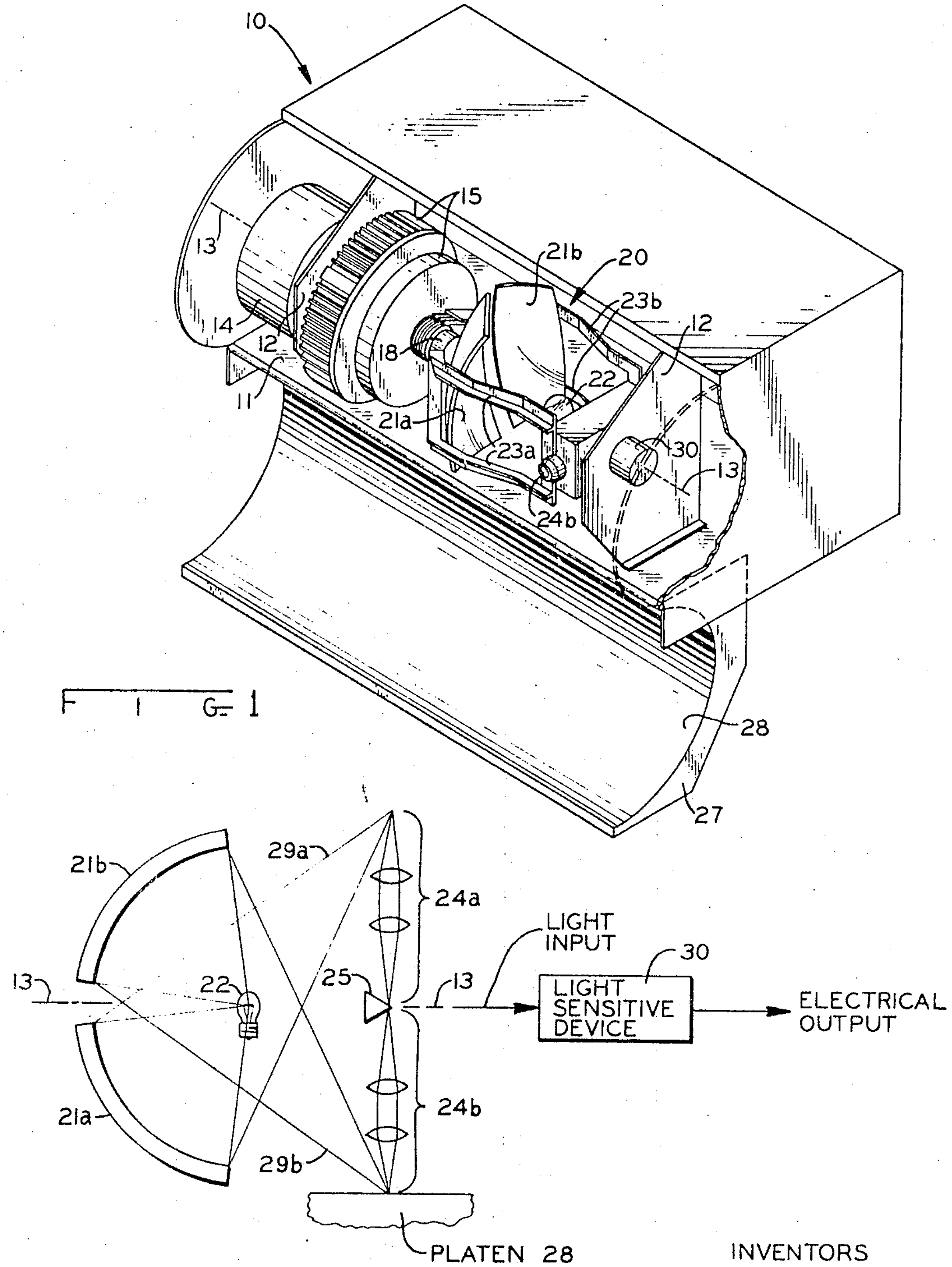
FIG. 1 shows a perspective view of a facsimile scanner which can utilize the light balancing shade in accordance with our invention.
FIG. 2 shows a diagrammatic view of the two light paths provided by the facsimile scanner of FIG. 1.

In FIG. 1, we have shown a facsimile scanner 10 which can utilize the light balancing shade in accordance with our invention. The scanner 10 shown in FIG. 1 may also include receiving apparatus for transforming electrical signals into markings on a sheet of paper so as to reproduce a document being scanned at a distant location. The facsimile scanner 10 is mounted on a suitable base 11 which supports a plurality of brackets 12. The brackets 12 support a rotating structure for scanning (and also for marking if the facsimile scanner 10 is used to receive). This rotating structure rotates about a longitudinal axis 13, and comprises a stationary electric drive motor 14. The output from the drive motor 14 is coupled to speed reducing and synchronizing gears 15. The output from the gears 15 is derived at an output shaft 18 which rotates about the longitudinal axis 13. A yoke structure generally designated by the numeral 20 is connected to the output shaft 18. The yoke structure 20 comprises two concave mirrors **21*a*, 21*b* which are symmetrically positioned about the longitudinal axis 13, and which receive light from an incandescent lamp 22 whose filament is centered as nearly as possible on the longitudinal axis 13. A set of arms 23*a*, 23*b* extend from the output shaft 18 around the mirrors 21*a*, 21*b* toward the right, as viewed in FIG. 1, and connect with a lens structure comprising two scanning lens systems or arrangements 24*a*, 24*b*. (System 24*a*** is not visible in FIG. 1.)

The facsimile scanner 10 also includes a cover member 27 which is pivotally or otherwise attached to the base 11 to permit the cover member 27 to be positioned around the rotating structure of the scanner 10. The cover member 27 has a concave (preferably partially cylindrical) platen 28 that receives the paper or document to be scanned. When the platen 28 is in its proper position, it curves around the rotating structure and is parallel to the longitudinal axis 13. The platen 28 includes means (not shown) for moving the document being scanned parallel to the longitudinal axis 13. With respect to FIG. 2, when the platen 28 and a document are in position, and when the rotating structure is rotating about the longitudinal axis 13, two rotating beams of light **29*a*, 29*b* are respectively produced by the concave mirrors 21*a*, 21*b***. Each of these beams of light 29*a*, 29*b* is focused at a point or location that is positioned on a common diameter which passes transversely through the longitudinal axis 13, and which is positioned on the common diameter at substantially equal distances from the longitudinal axis 13. The platen 28 is positioned at this same distance from the longitudinal axis 13 so that the beams of light 29*a*, 29*b* provide a spot of light having the desired selected area on the platen 28. As is apparent from FIGS. 1 and 2, only one spot of light impinges on the platen 28 at any given time. The two spots of light alternately sweep or scan over the platen 28 and the document positioned on the platen 28. At the same time that the spots scan the document, the document is moved parallel to the longitudinal axis 13 at a slower speed so that the spots can scan the entire document. The moving spots of light illuminate a small area of the document being scanned. The amount of light reflected from this small area of illumination indicates whether this area on the document has a color that is light, dark, or some intermediate shade. This reflected light is directed by the respective lens systems 24*a*, 24*b* and a reflecting prism 25 (shown in FIG. 2) along the longitudinal axis 13 and focused on a light sensitive device 30. The light sensitive device 30 converts this reflected light into electrical signals which can be transmitted to a distant location for utilization and reproduction of the document.

Figure 3:
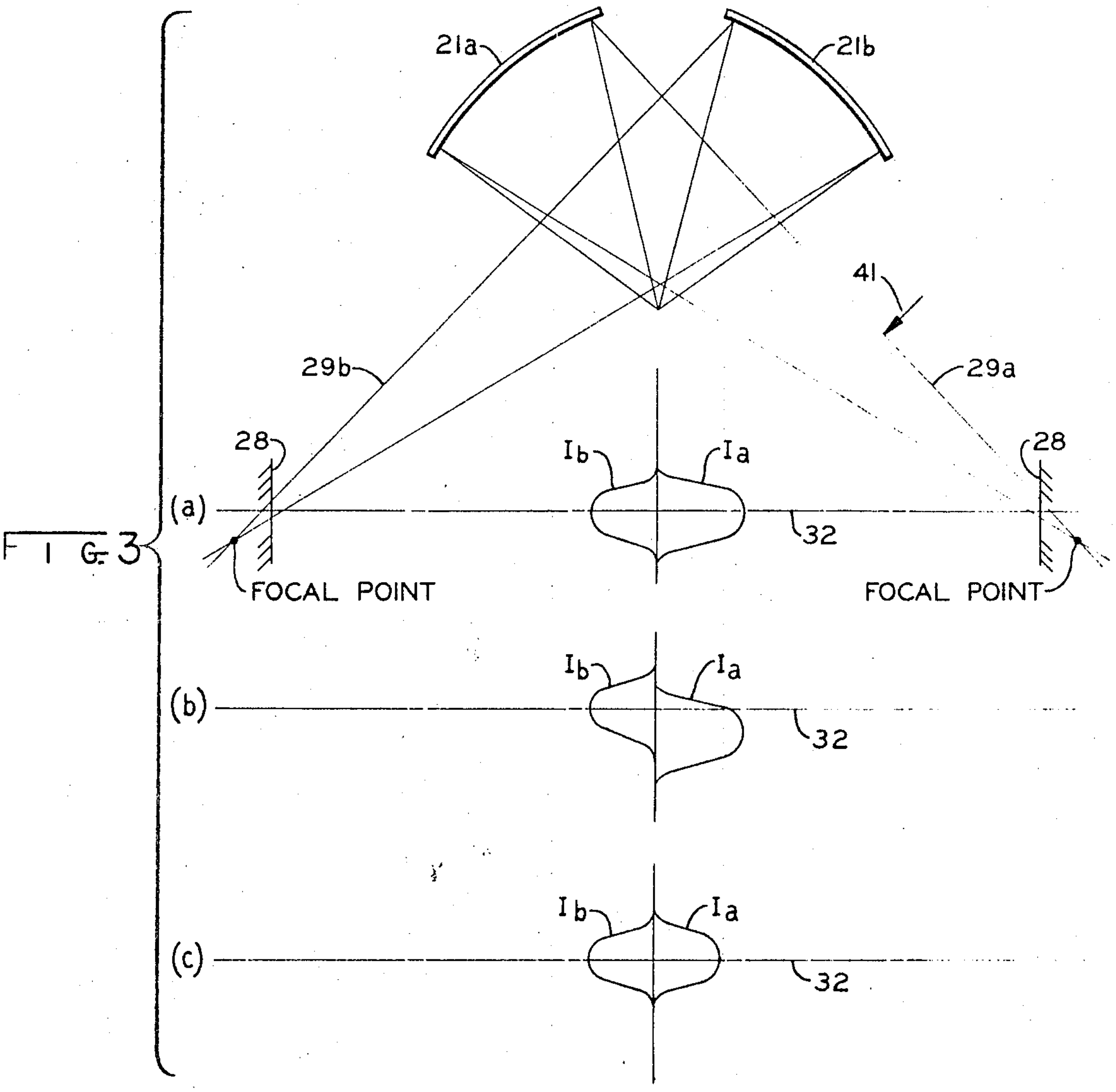
FIGS. 3*a*, 3*b*, and 3*c* show diagrams illustrating how the light intensities may be made equal.

The system as described thus far is known in the art. While the system as described thus far operates reasonably well, persons skilled in the art will appreciate that the area and intensity of light provided on the document by the two beams of light 29*a*, 29*b* should be as nearly equal as possible. This is desirable so that there is continuity in the amount of light reflected from the document as a result of the scanning of the two spots of light. If one spot of light has a higher intensity than the other spot of light, then each time the higher intensity spot scans the document, a higher level of light will be reflected to the light sensitive device 30, and a higher electrical signal will be produced. This higher level of reflected light generally indicates a lighter surface color, and the document being reproduced will have a corresponding lighter surface color during the time that the higher intensity spot of light scans the document. In other words, on each pass of the higher intensity spot of light, the facsimile scanner 10 will produce an electrical signal which indicates a lighter surface color being scanned, when in fact the color of the surface being scanned at that particular time may be darker. This situation is illustrated diagrammatically in FIG. 3, where we have shown the two mirrors 21*a*, 21*b* and their respective beams of light 29*a*, 29*b* impinging on the platen 28. (Actually only one of the beams of light 29*a*, 29*b* impinge on the platen 28 at any one time, but both beams of light 29*a*, 29*b* are shown impinging on the platen 28 for comparison.) In FIG. 3*a*, it has been assumed that some difference between the mirrors 21*a*, 21*b* results in the mirror 21*a* producing a beam 29*a* having a higher intensity at the platen 28. This is illustrated graphically by the two curves labeled $I_a$ and $I_b$ in FIG. 3*a*. These two curves $I_a$ and $I_b$ represent the distribution of the light intensity along the platen 28. A line 32 is shown in FIGS. 3*a*, 3*b*, and 3*c*. This line 32 represents the scanning axis or diameter on which the spots of light rotate about the longitudinal axis 13. In FIG. 3*a*, the intensity curves $I_a$ and $I_b$ are shown in a symmetrical position on each side of the scanning axis 32. This symmetrical position of the two intensity curves $I_a$ and $I_b$ represents the condition which is obtained when the mirrors 21*a*, 21*b* focus their beams of light 29*a*, 29*b* at the same locations with respect to the scanning axis 32. However, in FIG. 3*a*, it will be seen that the peak intensity of the curve I*a* (i.e., the point where the curve $I_a$ crosses the axis 32) is greater than the peak intensity of the curve $I_b$ (i.e., where the curve $I_b$ crosses the axis 32). These different peak intensities result in unequal reflected light, and cause the document reproduced to be distorted, or in some cases useless. Thus, it is desirable that the two spots of light have intensities that are as nearly equal as possible. Recognizing this problem, persons skilled in the art have attempted to correct the unequal intensities by shifting the focal point of the higher intensity spot of light along the platen 28. Thus, the higher intensity spot of light can have its focal point moved up or down as viewed in FIG. 3*a* along the platen 28. FIG. 3*b* shows the effect of moving the focal point of the beam of light 29*a* in a downward direction. This causes the intensity curve $I_a$ to move downward. The focal point of the beam 29*a* is adjusted so that the light intensity curve $I_a$ crosses the scanning axis 32 at a point which represents the same intensity as the point where the light intensity curve $I_b$ crosses the scanning axis 32. However, we have found that this means for making the two intensities equal is undesirable. In FIG. 3*b*, it will be seen that the light intensity curve $I_a$ intersects the scanning axis 32 along a portion of the curve $I_a$ that has a relatively steep slope. If the mirror 21*a* moves the slightest amount, such as from vibration or other shock, this will cause its focal point to move. Since the light intensity curve $I_a$ has a steep slope at its point of intersection with the axis 32, this slight movement will cause a relatively large change in light intensity. Therefore, we have found that it is very difficult, if not impossible, to maintain equal light intensities by shifting the focal point of one of the mirrors.

Figure 4:
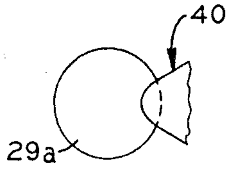
FIG. 4 shows a diagram illustrating how a light shade in accordance with our invention is inserted in a path of scanning light.

FIG. 4 shows the means we have devised for making the light intensities equal. In accordance with our invention, we provide an opaque light shade 40 that has an arrangement and structure (which will be subsequently described) for the purpose of shading or blocking a portion of the light beam 29*a* (which was assumed to be the higher intensity light beam). This shade 40 is placed in the beam of light 29*a* for reducing the overall intensity of the beam 29*a*. With respect to FIG. 3*a*, the shade 40 is preferably introduced at the location indicated by the arrow 41 until the two light intensities are equal. In using our light shade 40, we prefer that the two mirrors 21*a*, 21*b* be directed and focused at the desired point so that their spots of light are symmetrical with respect to the scanning axis 32. Then, we introduce the shade 40 into the higher intensity beam 29*a* until its light intensity curve $I_a$ has a peak intensity where it crosses the axis 32 that is equal to the peak intensity of the curve $I_b$ where it crosses the axis 32. This condition is shown in FIG. 3*c*. The distribution of the light intensity is relatively flat at the peak of the intensity curves $I_a$ and $I_b$, so that a scanner using a light balancing shade in accordance with our invention can tolerate some vibration and shock without a change of light intensity between the two spots. Thus, our invention provides an improved facsimile scanner using two spots of light whose intensities can be made and held equal by a relatively simple expedient.

Figure 5:
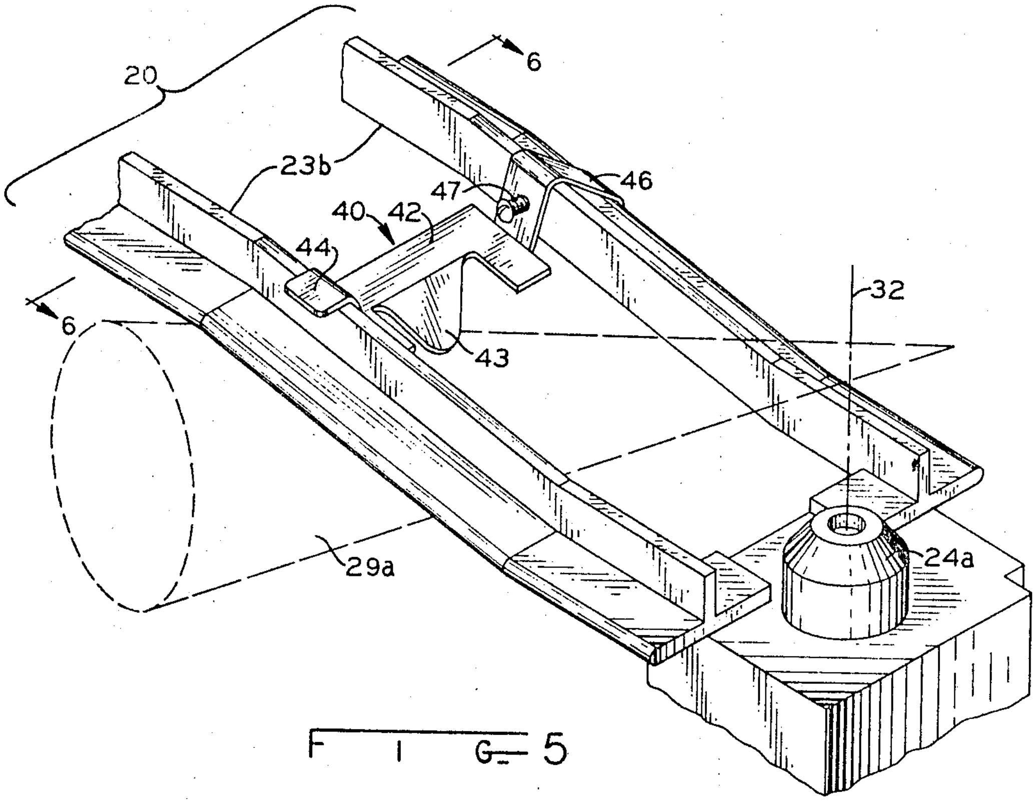
FIG. 5 shows a perspective view of a preferred embodiment of our light balancing shade as utilized in the facsimile scanner of FIG. 1.
Figure 6:
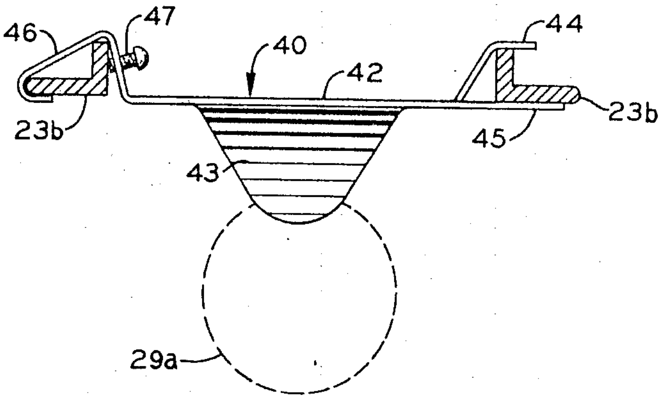
FIG. 6 shows a cross-sectional view of our light balancing shade taken along the line 6–6 in FIG. 5.

FIGS. 5 and 6 show a preferred embodiment of our light shade 40 as utilized with the yoke structure 20 of FIG. 1. The shade 40 comprises a central member 42 that is positioned between the two arms 23*b* so as to block or shade a portion of the assumed higher intensity light beam 29*a*. This central member 42 is formed and bent to provide an opaque shading tab 43 which extends transversely across the beam of light 29*a* as shown in FIG. 5. The shade 40 may be adjustably mounted on the arms 23*b* by any suitable means, such as a pair of arms 44, 45 which extend above and below one of the arms 23*b* at one end, and a clamping arm 46 which is bent to be positioned around the other arm 23*b* at the other end. The clamping arm 46 is provided with a clamping screw 47 which is threaded into the arm 46 and compresses the shade 40 into fixed position on the yoke arms 23*b*. The shade 40 is made of any suitable metallic material that preferably has a dark finish so that it does not reflect any light. As seen in FIG. 5, the shade 40 may be positioned on the yoke arms 23*b* to provide the desired light intensity for the beam 29*a*, after which the shade 40 can be clamped by tightening the clamping screw 47.

It will thus be seen that our invention provides a new and improved light balancing shade for facsimile scanners. Our shade permits the concave mirrors to be adjusted so that their focal points are at the desired location, after which the higher intensity light beam can be corrected by our shade so that its spot has the same intensity as the other spot. While we have shown only one embodiment of our shade, persons skilled in the art will appreciate that modifications may be made. The main requirement is that the shade permits the higher intensity beam of light to be corrected so that its spot of light has the same intensity as the other spot of light. The light shade can be used at any convenient location along the axis of the light cone. If a section is taken in a plane perpendicular to the axis of the cone, a circle is formed. It is preferable to insert the shade at a point where this circle diameter is quite large instead of close to the focal point. The sensitivity of the shade adjustment is greatly reduced when removing the shade position as far as possible from the focal point. This will depend upon the most convenient mounting position of the light shade. Also, the shade may be an aperture or adjustable stop. Therefore, while our invention has been described with reference to a particular embodiment, it is to be understood that modifications may be made without departing from the spirit of the invention or from the scope of the claims.

We claim:

1. An improved optical illuminating arrangement for facsimile transmitting apparatus having a yoke structure that is adapted to rotate about a longitudinal axis, a lamp mounted on said yoke structure to provide a source of illumination at a selected location substantially on said axis, and first and second mirror surfaces positioned at corresponding and symmetrical locations with respect to said axis to receive light from said lamp, direct the received light in respective beams, and focus the light beams at respective locations positioned substantially on a common diameter passing through said axis and at substantially equal distances from said axis, said optical illuminating arrangement comprising an opaque shade positioned on said yoke structure in the vicinity of the one of the light beams that would produce the greater light intensity at one of the respective locations, said shade being attached to the yoke structure by means which permit the position of said shade to be adjusted with respect to said one light beam so as to provide light intensity at said one location that is substantially equal to the light intensity at the other location, and said shade being attached to the yoke structure by means which can selectively hold said shade in the desired adjusted position.

2. The improved optical illuminating arrangement of claim 1 wherein said shade has a finish that is substantially nonreflecting.